(12) United States Patent
Nagatani et al.

(10) Patent No.: US 7,848,598 B2
(45) Date of Patent: Dec. 7, 2010

(54) IMAGE RETRIEVAL PROCESSING TO OBTAIN STATIC IMAGE DATA FROM VIDEO DATA

(75) Inventors: Shunsuke Nagatani, Shinjuku-ku (JP);
Michitoshi Suzuki, Shinjuku-ku (JP);
Shinya Taguchi, Shinjuku-ku (JP);
Masakazu Ogawa, Shinjuku-ku (JP);
Yutaka Egawa, Shinjuku-ku (JP);
Nobuyuki Yamazoe, Shinjuku-ku (JP);
Eisuke Kanno, Shinjuku-ku (JP)

(73) Assignee: Fuji Xerox Co., Ltd., Tokyo (JP)

( * ) Notice: Subject to any disclaimer, the term of this patent is extended or adjusted under 35 U.S.C. 154(b) by 827 days.

(21) Appl. No.: 10/661,590

(22) Filed: Sep. 15, 2003

(65) Prior Publication Data
US 2004/0056881 A1    Mar. 25, 2004

(30) Foreign Application Priority Data
Sep. 19, 2002    (JP)    ............................. 2002-272567

(51) Int. Cl.
*G06K 9/32* (2006.01)
(52) U.S. Cl. ...................... 382/305; 715/723; 715/730; 715/753
(58) Field of Classification Search ......... 715/723–726, 715/243–253, 753–758, 730–732; 382/305, 382/306
See application file for complete search history.

(56) References Cited

U.S. PATENT DOCUMENTS

| | | | |
|---|---|---|---|
| 5,521,841 A * | 5/1996 | Arman et al. ................ | 715/723 |
| 5,760,767 A | 6/1998 | Shore et al. | |
| 5,852,435 A | 12/1998 | Vigneaux et al. | |
| 6,249,281 B1 * | 6/2001 | Chen et al. .................. | 715/753 |
| 6,332,147 B1 | 12/2001 | Moran et al. | |
| 6,463,444 B1 * | 10/2002 | Jain et al. ................. | 707/104.1 |
| RE38,401 E | 1/2004 | Goldberg et al. | |
| 6,751,776 B1 * | 6/2004 | Gong ....................... | 715/500.1 |
| 6,789,228 B1 * | 9/2004 | Merril et al. ................ | 715/243 |
| RE38,609 E | 10/2004 | Chen et al. | |
| 6,804,684 B2 * | 10/2004 | Stubler et al. ............. | 707/104.1 |

(Continued)

FOREIGN PATENT DOCUMENTS

JP    A 05-282379    10/1993

(Continued)

OTHER PUBLICATIONS

S. Uchihashi et al., "Video Manga: Generating Semantically Meaningful Video Summaries," Proceedings of the ACM Multimedia, pp. 383-392, 1999.*

(Continued)

*Primary Examiner*—Bhavesh M Mehta
*Assistant Examiner*—Sean Motsinger
(74) *Attorney, Agent, or Firm*—Oliff & Berridge, PLC

(57) ABSTRACT

Desired data can be easily retrieved from material image data associated with video data. For material image data associated with video data, character strings contained in relevant material images are extracted, and keywords input to keyword input parts of a user interface are matched with the extracted characters to retrieve data of the relevant material images. The retrieved material images are changed in size according to their importance before being displayed on a screen.

9 Claims, 15 Drawing Sheets

U.S. PATENT DOCUMENTS

| | | | |
|---|---|---|---|
| 6,807,361 B1 | 10/2004 | Girgensohn et al. | |
| 6,834,371 B1 * | 12/2004 | Jensen et al. | 715/500.1 |
| 6,988,244 B1 * | 1/2006 | Honda et al. | 715/721 |
| 7,068,309 B2 * | 6/2006 | Toyama et al. | 348/231.5 |
| 7,143,362 B2 | 11/2006 | Dieberger et al. | |
| 7,149,974 B2 | 12/2006 | Girgensohn et al. | |
| 7,167,191 B2 * | 1/2007 | Hull et al. | 715/748 |
| 7,174,055 B2 * | 2/2007 | Hori et al. | 382/305 |
| 7,203,380 B2 | 4/2007 | Chiu et al. | |
| 7,209,942 B1 * | 4/2007 | Hori et al. | 709/203 |
| 2003/0177115 A1 * | 9/2003 | Stern et al. | 707/4 |
| 2003/0184598 A1 | 10/2003 | Graham | |
| 2003/0189588 A1 | 10/2003 | Girgensohn et al. | |
| 2004/0155898 A1 * | 8/2004 | Taguchi et al. | 345/723 |

FOREIGN PATENT DOCUMENTS

| | | |
|---|---|---|
| JP | A-09-069165 | 3/1997 |
| JP | A-09-116740 | 5/1997 |
| JP | A 11-039343 | 2/1999 |
| JP | A-11-144067 | 5/1999 |
| JP | 11-184867 A * | 7/1999 |
| JP | A 11-308567 | 11/1999 |
| JP | A 2000-115736 | 4/2000 |
| JP | A 2000-278635 | 10/2000 |
| JP | A-2001-209361 | 8/2001 |
| JP | A 2002-229438 | 8/2002 |
| JP | A-2002-272567 | 9/2002 |

OTHER PUBLICATIONS

Clements, Cardillo and Miller Phonetic Searching of Digirtal Audio Published 2001 Washington National Association of Broadcasters p. 131-140.*
Nov. 6, 2006 Office Action Issued in U.S. Appl. No. 10/625,700.
Apr. 30, 2007 Final Office Action Issued in U.S. Appl. No. 10/625,700.
Aug. 22, 2007 Office Action Issued in U.S. Appl. No. 10/625,700.
Feb. 6, 2008 Final Office Action Issued in U.S. Appl. No. 10/625,700.
Jun. 9, 2008 Final Office Action Issued in U.S. Appl. No. 10/625,700.
Dec. 23, 2008 Office Action Issued in U.S. Appl. No. 10/625,700.
Aug. 14, 2009 Final Office Action Issued in U.S. Appl. No. 10/625,700.
Feb. 4, 2010 Office Action Issued in U.S.. Appl. No. 10/625,700.
Notice of Allowance issued in U.S. Appl. No. 10/625,700; mailed Oct. 18, 2010.

* cited by examiner

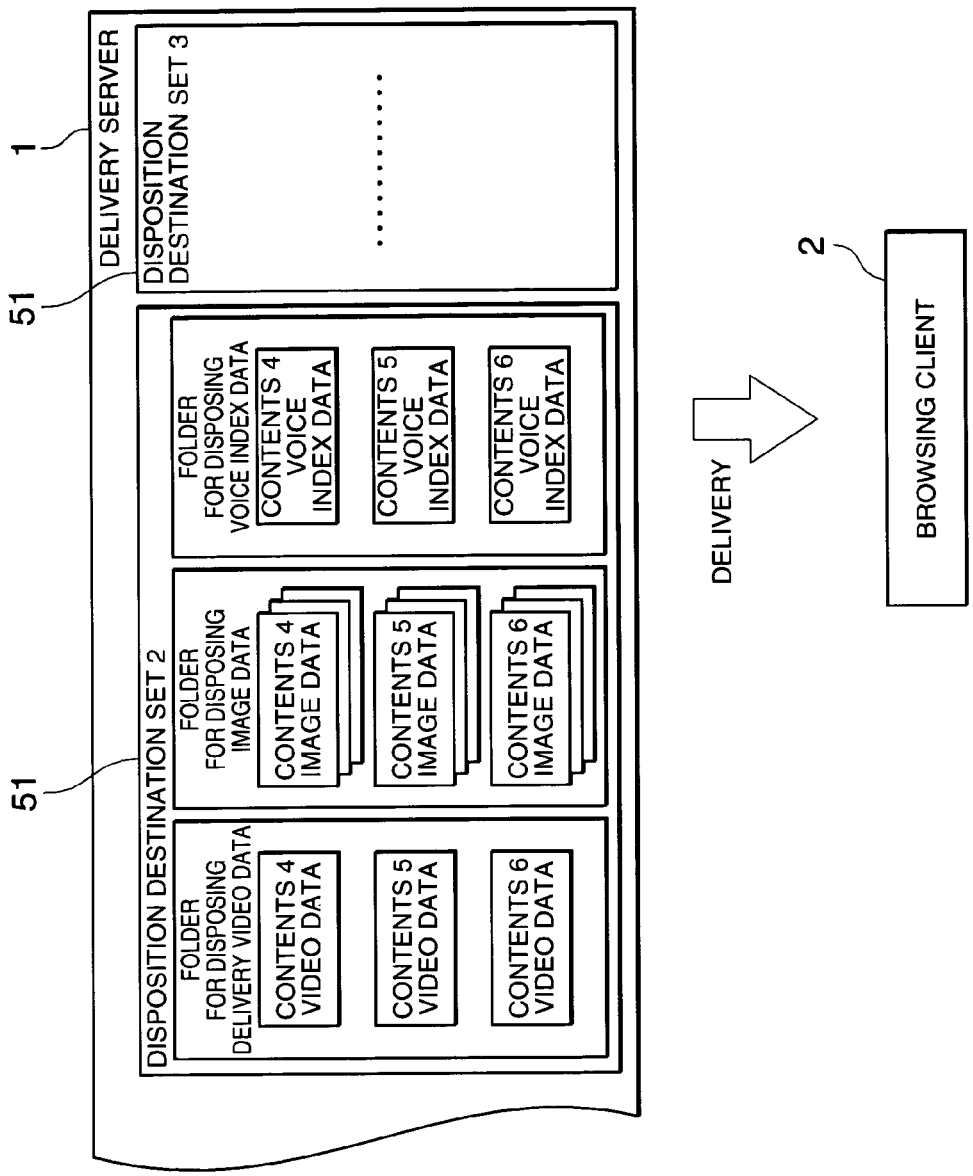

IMAGE RETRIEVAL PROCESSING TO OBTAIN STATIC IMAGE DATA FROM VIDEO DATA

BACKGROUND OF THE INVENTION

1. Field of the Invention

The present invention relates to a system that performs retrieval processing for static image data associated with video data (moving image data).

2. Description of the Related Art

Services for delivering various contents to browsing clients such as personal computers and mobile terminals are widely provided as services for specific areas or global areas.

There are different types of systems performing such contents delivery. With the development of network communication technology, contents data containing video data is also delivered.

In these contents delivery systems, various contents data is registered in a delivery server, and when browsing clients access the delivery server to select and request desired contents, in response to it, the delivery server provides the contents data to the browsing clients.

In systems delivering video data, to ease selection of contents, the video data is associated with contents records (meta-records) including contents title, keyword for selecting contents, category information for selecting contents, contents author information, and the like, providing convenience for users who view contents by use of the browsing clients.

There is delivered video data of a wide range of fields from amusements such as movies to education, lecture, presentation, and minutes. Especially for video of lectures, presentations, minutes, and the like produced with use of materials, there is a demand to provide static images of the materials also to browsing clients together with video images, and synchronously reproduce these images to enrich information provision.

In the case where the above system is realized, if it could be determined what static images of materials and the like are associated with the video data, desired video data would be conveniently located from many video data pieces. Also, conveniently, desired static image data would be located from many static images associated with the video data. Furthermore, from reproduction time positions in video data associated with static image data, relevant video data could be located and reproduced.

However, since image retrieval has relied on users' visual search operations, retrieval operations have been extremely cumbersome in the case where many video data pieces and static images associated therewith are processed.

SUMMARY OF THE INVENTION

The present invention has been made in view of the above circumstances and aims at easing the retrieval of desired static images and video data.

The present invention also aims at easily locating desired scenes from video data.

Other features and advantages of the present invention will be apparent from the following description.

The present invention is embodied in various forms such as an image retrieval system, an image retrieval method, and recording media storing a program for achieving the same by a computer. In any of the forms, static image data associated with video data is retrieved by a simple method referred to as keyword retrieval.

An image retrieval system of the present invention accepts keyword input by an input unit, extracts character strings contained in static image data by an extraction unit, and matches the extracted character strings with an input keyword by a retrieval unit to retrieve relevant static image data.

The retrieval of character strings can be performed by known methods. For example, if static image data has text data of a character string, the text data may be extracted, and if static image data is image data, character string data may be extracted by character recognition processing.

In an image retrieval system of the present invention, static image data output as retrieval results may be displayed as a list of images, wherein the static image data may be displayed in image sizes changed according to a predetermined criterion. This makes it easy to visually select static image data under the criterion. As the criterion, there are adopted the length of reproduction time (that is, scene length) of video data with which static image data is associated, the importance of preset character strings, the amount of additional image data such as arrows and comments displayed additionally to static images, and the like. Static images conforming to the criterion can be displayed in larger size.

In the image retrieval system of the present invention, static image data as retrieval results may be displayed as images, and according to user operation input for selecting displayed static images, video data may be reproduced and displayed as images from reproduction time positions in which the static image data is associated. This facilitates random positioning such as reproduction of desired video data, based on retrieval of static images.

Although the above system may have individual functions configured as dedicated devices, it can be implemented by having a computer execute a program stored in recording media according to the present invention.

A method according to the present invention is implemented by the above system.

BRIEF DESCRIPTION OF THE DRAWINGS

Preferred embodiments of the present invention will be described in detail based on the followings, wherein.

DESCRIPTION OF THE PREFERRED EMBODIMENTS

The present invention will be concretely described on the basis of preferred embodiments.

Figure 1:
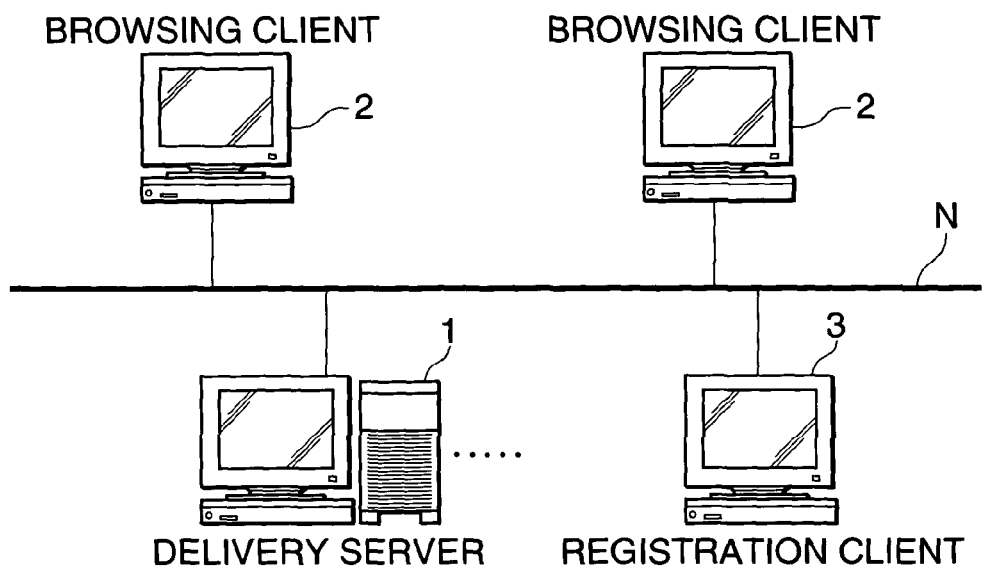
FIG. 1 is a diagram showing the configuration of a system according to the present invention.

FIG. 1 shows a contents delivery system to which the present invention is applied. The system includes a delivery server 1, browsing clients 2, and a registration client 3, which are connected through the Internet. The present invention is primarily applied to the browsing clients 2.

The delivery server 1, browsing clients 2, and registration client 3 each are configured to perform predetermined processing by executing a program according to the present invention by computer hardware. Especially, the browsing clients 2 are configured by the personal computer having a browser function for browsing contents.

The delivery server 1 stores the following data for each of contents: video data, static image data such as slide image data and material image data associated with the video data, voice index data for retrieval, and contents records (the meta-data) such as contents title. In response to a request from the browsing clients 2, the delivery server 1 delivers relevant contents data.

Figure 2A:
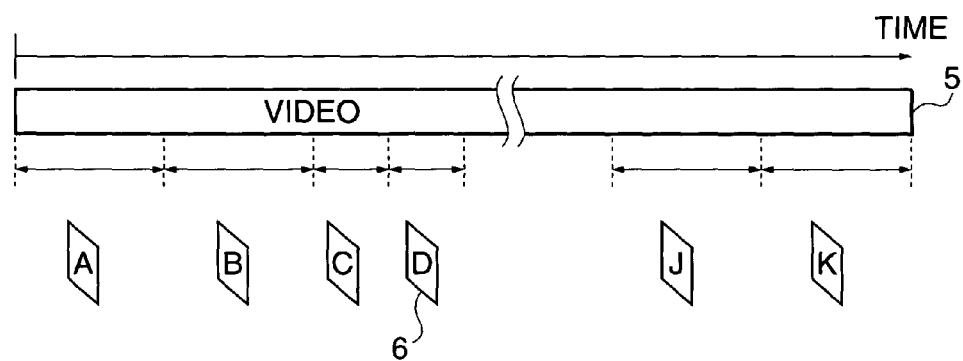
FIGS. 2A and 2B are diagrams for explaining a relationship between video data and image data according to an embodiment of the present invention.
Figure 2B:
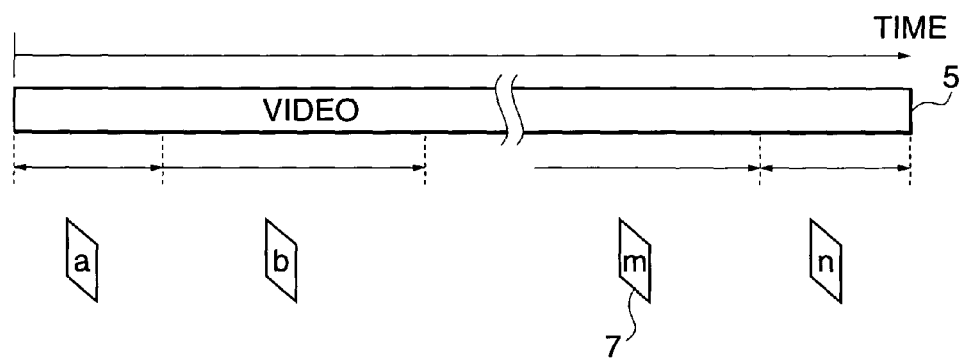

FIG. 2A shows correspondences between video data 5 and slide image data 6, and FIG. 2B shows correspondences between video data 5 and material image data 7.

Only one of the slide image data 6 and the material image data 7 may be associated with the video data 5. In the description of this specification, unless otherwise noted, both or one of the slide image data 6 and the material image data 7 may be described as image data.

In this example, although keyword retrieval processing for material image data is primarily described as an aspect of the present invention, the same keyword retrieval may be performed for the slide image data as well.

The video data 5 registered is moving image data transformed to a stream format for delivery from a format such as MPEG. The slide image data 6 (A to K) is static image data extracted by automatic processing or operator operation from the video data 5 by preprocessing before disposition registration. These pieces of slide image data 6 are scene images representatively representing scenes having a certain time width in the video, and are associated with corresponding scenes of the video data 5.

The slide image data is primarily presented for visual retrieval by which browsing users search for desired contents and search for desired scenes in contents video.

The material image data 7 (a to n) is static image data associated with arbitrary reproduction time positions of the video data 5 by an operator who reproduces the video data 5 and performs association operation while viewing video images in preprocessing by the registration client 3 before disposition registration. For example, the video data 5 is the product of the photographing of presentation, lecture, and the like, while the static image data is the product of the photographing of materials used in the presentation.

The material image data 7 is associated with the video data so as to be displayed on a screen until a time position is reached in which the next material image data is to be displayed. As a result, the material image data 7 is associated with scenes having a certain time width in the video in which the material is used, and browsing users can be allowed to reproduce and display relevant material image data synchronously with the video data.

Contents data such as the video data 5 as well as the static image data 6 and 7, in response to a request from the browsing clients 2 using the browser, as described later, is delivered by the delivery client 1, offered to the requesting browsing clients 2, and displayed on a screen of their display device.

Figure 3:
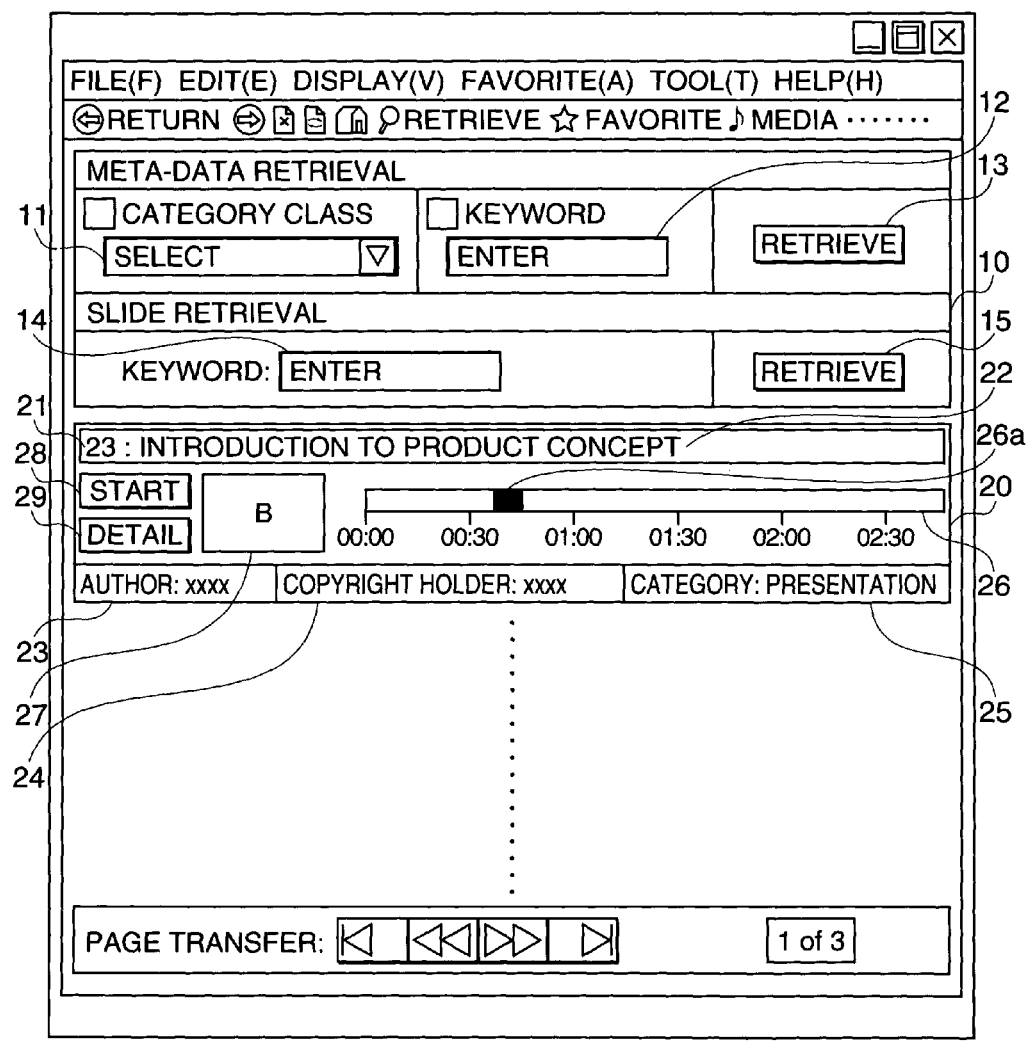
FIG. 3 is a diagram showing a screen display of a browsing client according to an embodiment of the present invention.

FIG. 3 shows a list of contents displayed as a default screen in the browsing clients 2 that have accessed the delivery server 1 by a proper URL. The contents list screen includes a retrieval interface 10 and plural contents interfaces 20, one for each contents. Browsing users can retrieve desired contents from registered contents by entering commands to the retrieval interface 10 by key entry or pointing input, and display and browse descriptions of the contents data on the screen by entering commands to the contents interfaces 20 by pointing input.

The retrieval interface 10 performs retrieval by use of meta-data and voice index data registered in the delivery server 1 in association with individual contents data, and further by use of character strings contained in the material image data 7. It is provided with: a drop-down window part 11 for selecting and inputting categories; a keyword input part 12 for retrieving desired contents data (see FIG. 13, element 130); a retrieval button 13 for requesting the delivery server 1 to perform retrieval processing and offer retrieval results, based on inputs from these parts; a keyword input part 14 for retrieving desired contents data by use of character strings contained in material images; and a retrieval button 15 for commanding the browsing clients 2 themselves to start retrieval processing, based on the input.

The voice index data registered in the delivery server 1 in association with contents data is voice waveform data contained in the contents. The delivery server 1 converts a keyword input from the keyword input part 14 into voice waveform data and compares these pieces of waveform data to retrieve contents containing the input keyword.

The contents interfaces 20 display: a contents number 21 based on the meta-data; a contents title 22; a contents author 23; a contents copyright holder 24; a contents category 25; a contents video time scale 26; and a slide image 27 of the contents video. A function of presenting the time scale 26 can change slide image data (A to K) 6 displayed as slide images 27 as a plug 26a is moved by user operations, and reproduce slide images in accordance with reproduction time positions of the video data.

The contents interfaces 20 are provided with a start button 28 and a detail button 29. When a user presses the start button 28, relevant contents video data can be reproduced and displayed on the screen (see FIG. 13, element 160) of the browsing clients 2 after being obtained from the delivery server 1. When the user presses the detail button 29, as described later, data of slide images and material images of relevant contents can be displayed on the screen of the browsing clients 2 after being collectively obtained from the delivery server 1.

Figure 4:
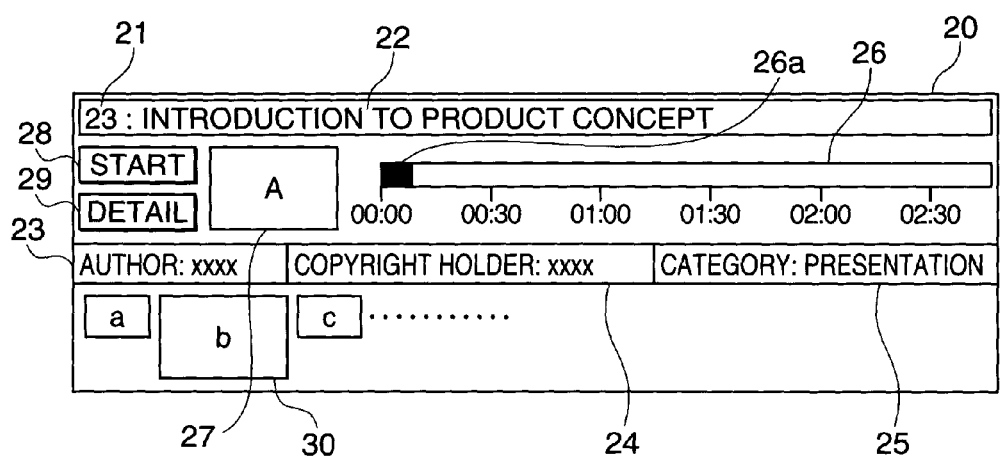
FIG. 4 is a diagram showing a screen display of the browsing client according to an embodiment of the present invention.

In this way, in the case where the video data 5 and all static image data associated with it are provided to the browsing clients 2, when the user specifies the slide images 27 and material images 30 (as shown in FIG. 4) that are displayed, by a pointing operation, video data is reproduced from corresponding scenes (that is, reproduction time positions) and displayed on the screen. This function is provided for the browsing clients 2.

Figure 14:
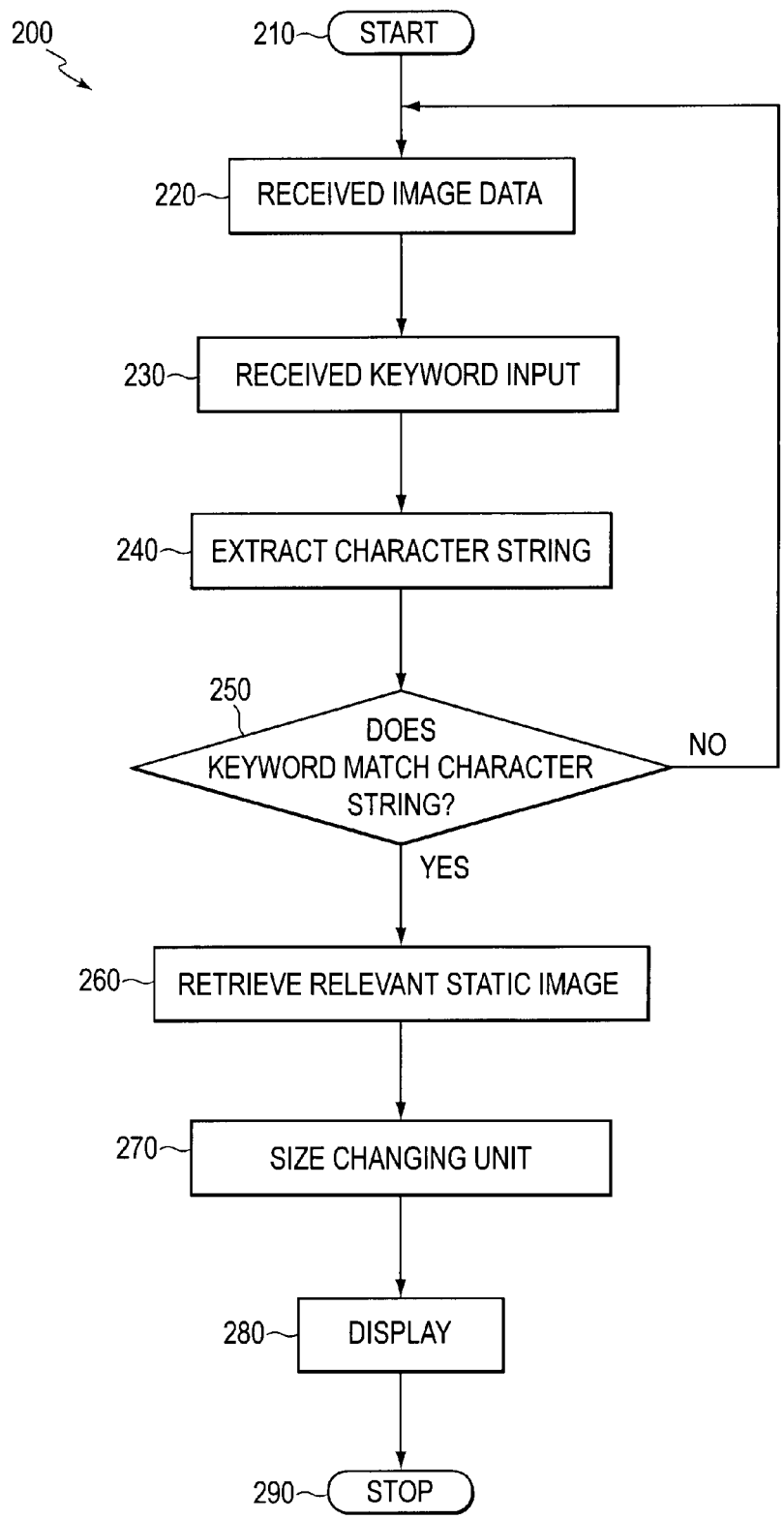
FIG. 14 illustrates a flowchart of one exemplary embodiment of an image retrieval method for video data according to the disclosure.

Contents stored in association with material screen data can be subjected to keyword retrieval (see FIG. 14, element 230) based on character strings (see FIG. 14, element 240) contained in relevant material images (see FIG. 14, element 220), and the contents interface 20 as shown in FIG. 4 is displayed (see FIG. 14, element 280) as a result of the retrieval.

The contents interface 20 is almost the same as those in FIG. 3. By matching character strings (see FIG. 14, element 250) contained in the material images 30 with an input keyword, a list of relevant material images 30 is displayed (see FIG. 14, element 260), and when the user specifies the displayed material images 30 by a pointing operation, contents video data is reproduced synchronously from corresponding scenes and displayed (see FIG. 14, element 280) on the screen. This function is also provided for the browsing clients 2.

Figure 5:
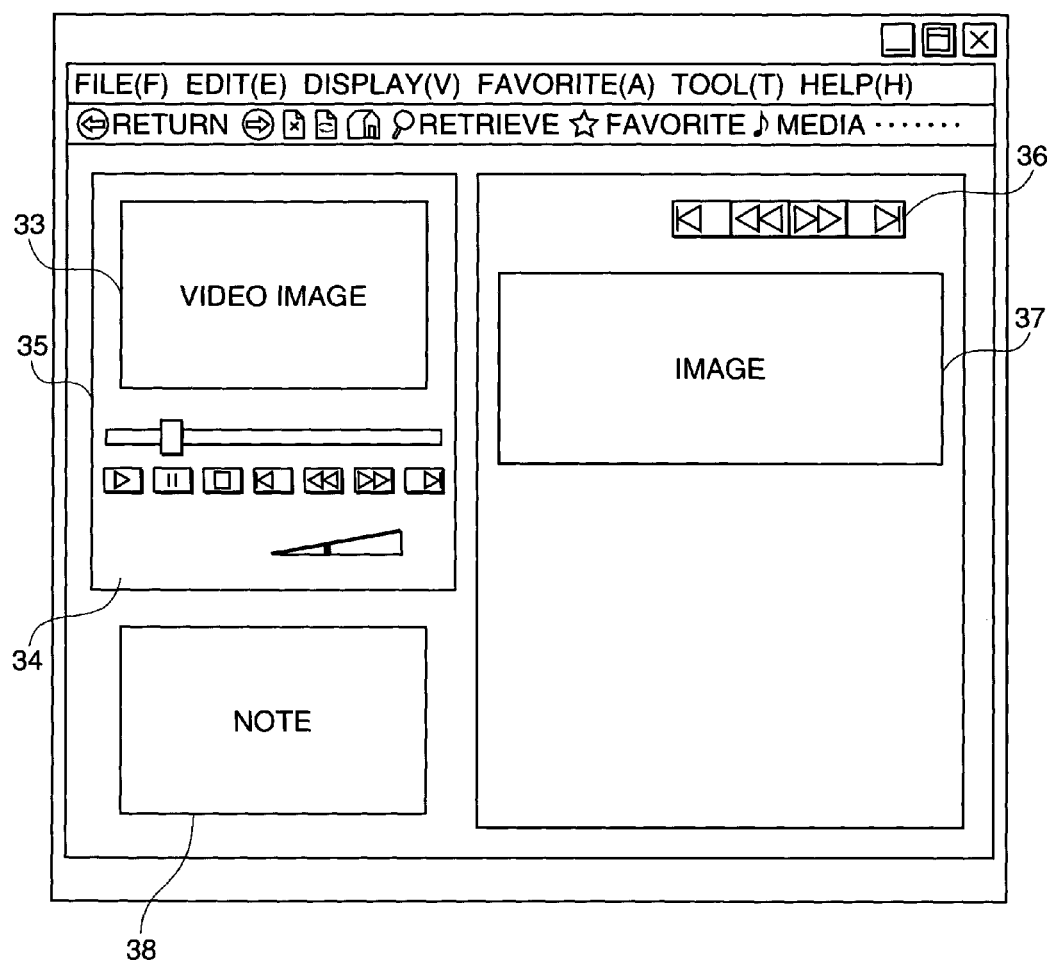
FIG. 5 is a diagram showing a screen display of the browsing client according to an embodiment of the present invention.

By the above user operations, the delivery server 1 is accessed and desired contents data is delivered to the browsing clients 2. The delivered contents data is displayed as a contents browsing screen by the browsing clients 2 as shown in FIG. 5. The contents browsing screen includes: a video screen 33 for displaying reproduced video images; a video player part 35 having a video operation part 34 provided with reproduction, stop, and other operation buttons; an image display part 37 for reproducing and displaying static image data wherein it has an operation part 36 provided with an operation button for advancing frames; and a note display screen part 38 for displaying a program description about contents data, and the like.

Therefore, the browsing user can, by performing operations by pointing input, reproduce video images on the video screen 33 and synchronously display material images (or slide images) corresponding to reproduction time positions of video data on the image display part 37.

By pressing the detail button 29, the delivery server 1 is accessed and image data of desired contents is collectively delivered to the browsing clients 2. The delivered image data is displayed as a detailed display screen as shown in FIG. 6 or 7 in the browsing clients 2.

Figure 6:
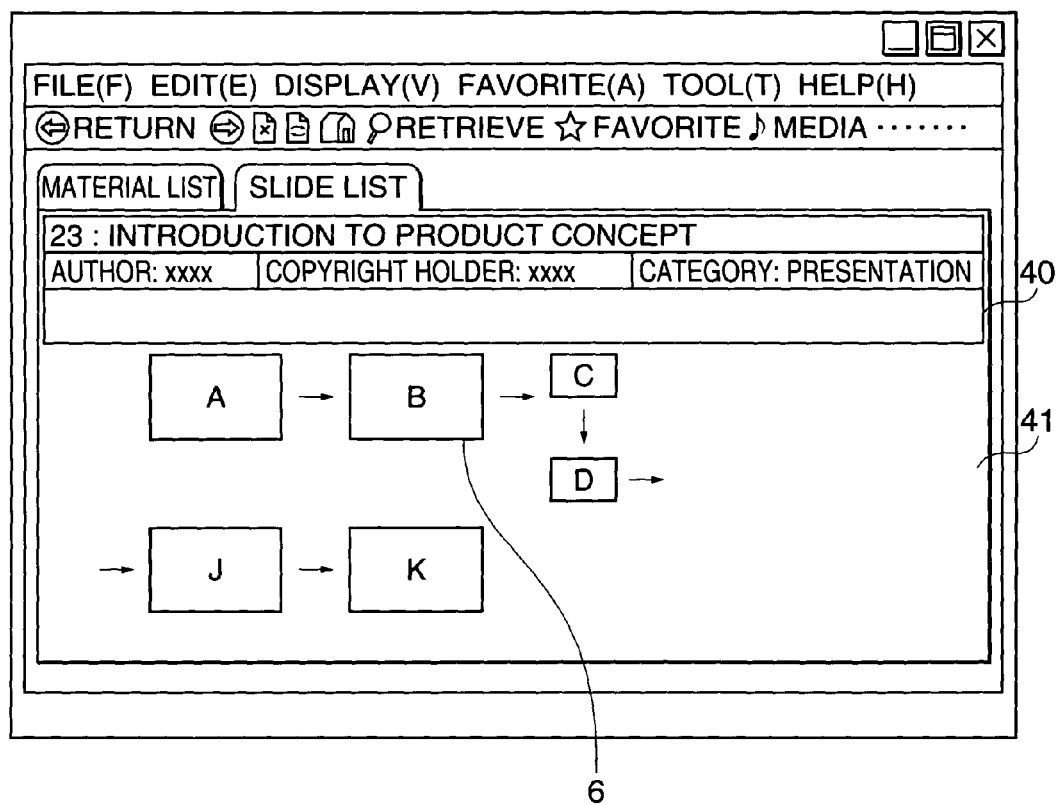
FIG. 6 is a diagram showing a screen display of the browsing client according to an embodiment of the present invention.
Figure 7:
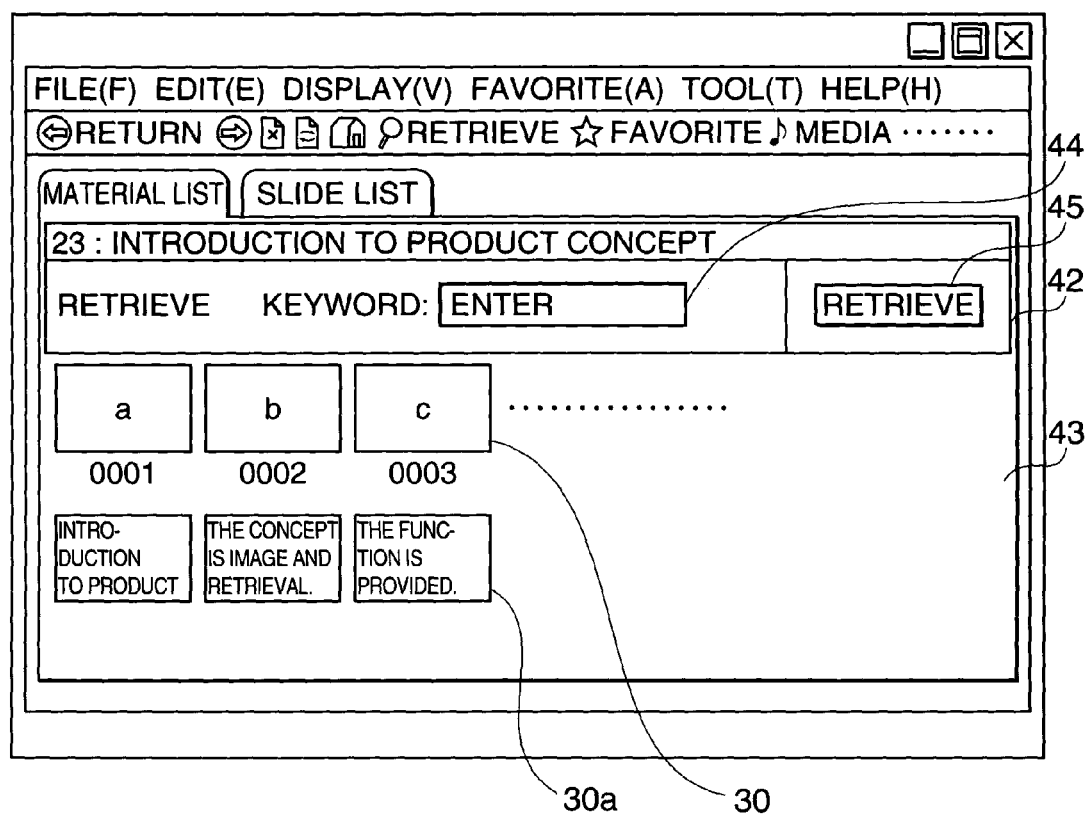
FIG. 7 is a diagram showing a screen display of the browsing client according to an embodiment of the present invention.

FIG. 6 shows a list image display of the slide image data 6 wherein various items of meta-data of relevant contents are displayed in a record data display part 40 and all slide images 6 associated with the video data of the relevant contents are displayed in time series in a slide image display part 41.

The slide images 6 are displayed in the slide image display part 41 so as to enlarge according to the time length of corresponding scenes. For example, as shown in FIG. 2A, slide images 6 such as C and D shorter in scene length than other slide images are displayed in smaller sizes other than the other slide images in the slide image display part 41. Such size change can be made in the delivery server 1 or the browsing clients 2 according to a detail display request, for example, by appending information about scene length to the slide images.

The sizes of display images may be changed (see FIG. 13, element 150) according to the magnitude of changes in scene contents, author's intention, or the importance of scenes.

FIG. 7 shows a list image display of the material image data 7 wherein various items of meta-data of relevant contents are displayed in a record data display part 42, and all time-series material images 30 associated with the video data of the relevant contents, and descriptive character strings 30a extracted from each of the material images 30 such as "product introduction..." contained in relevant images are displayed in a material image display part 43 as images. The character strings 30a are made of text data extracted (see FIG. 13, element 110) from the material image data 7 by character recognition processing and the like as required, and are matched (see FIG. 14, element 250) when the material images 30 are retrieved by keyword as described above.

Figure 13:
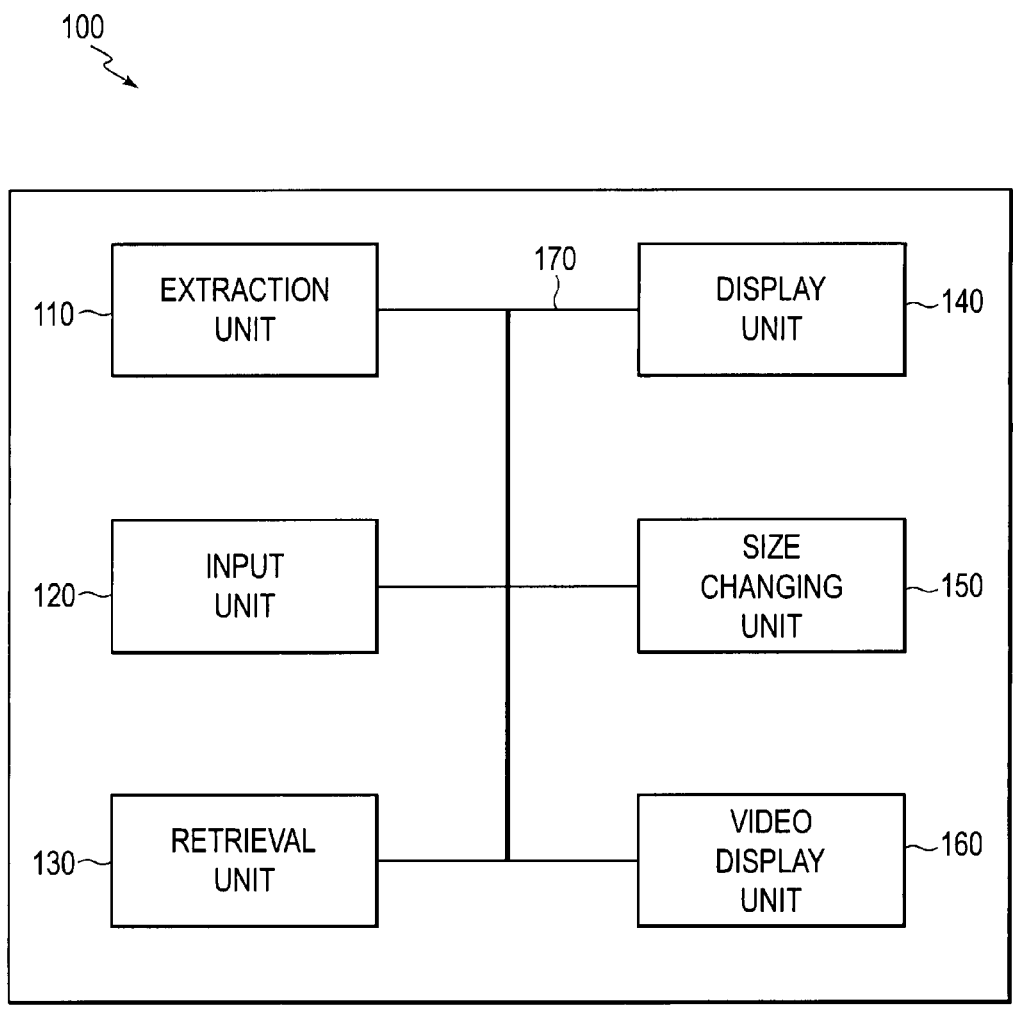
FIG. 13 illustrates a functional block diagram of a system for processing image data according to the disclosure.

The record display part 42 of the list display screen is provided with a keyword input part 44, and a retrieval button 45 for starting retrieval of character strings 30a by an input keyword (see FIG. 13, element 120). This interface also allows keyword retrieval of material images (see FIG. 13, element 130). Specifically, when the user inputs a desired keyword to the keyword input part 44 and presses the retrieval button 45, a retrieval function provided for the browsing clients 2 is started, a material image 30 containing an input keyword character string in the character strings 30a is retrieved, and a retrieval result is displayed as shown in FIG. 4.

Figure 8:
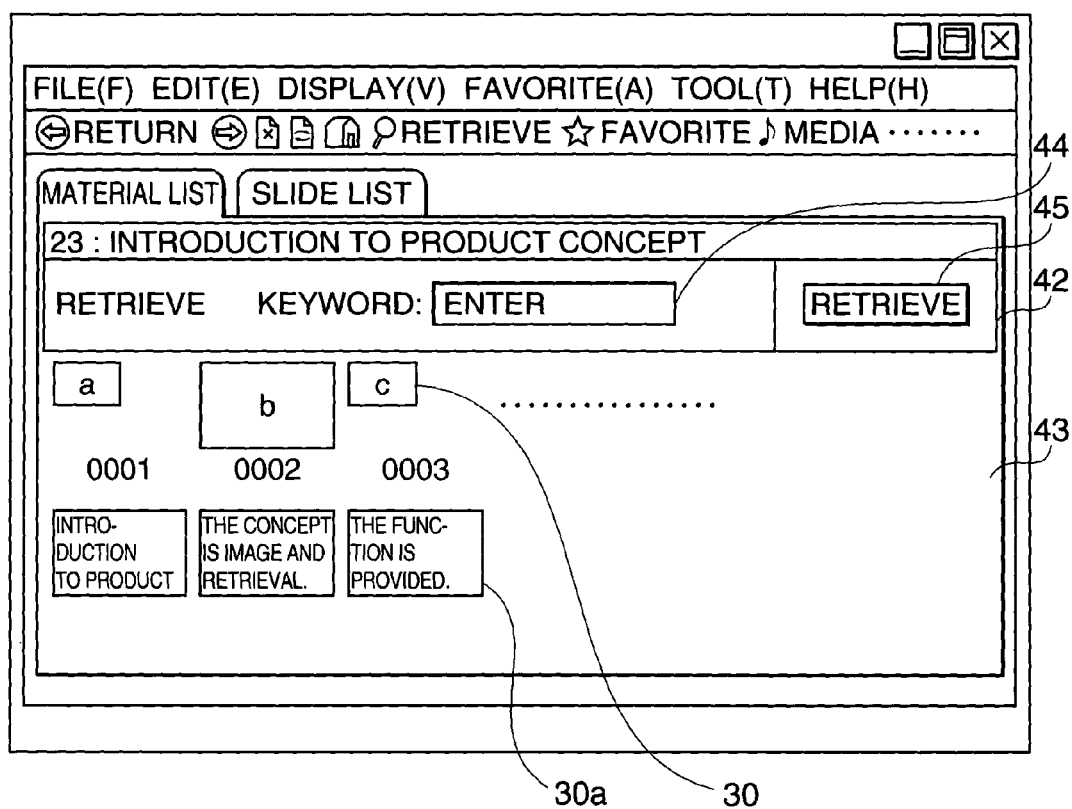
FIG. 8 is a diagram showing another embodiment of a screen display of the browsing client according to an embodiment of the present invention.
Figure 9:
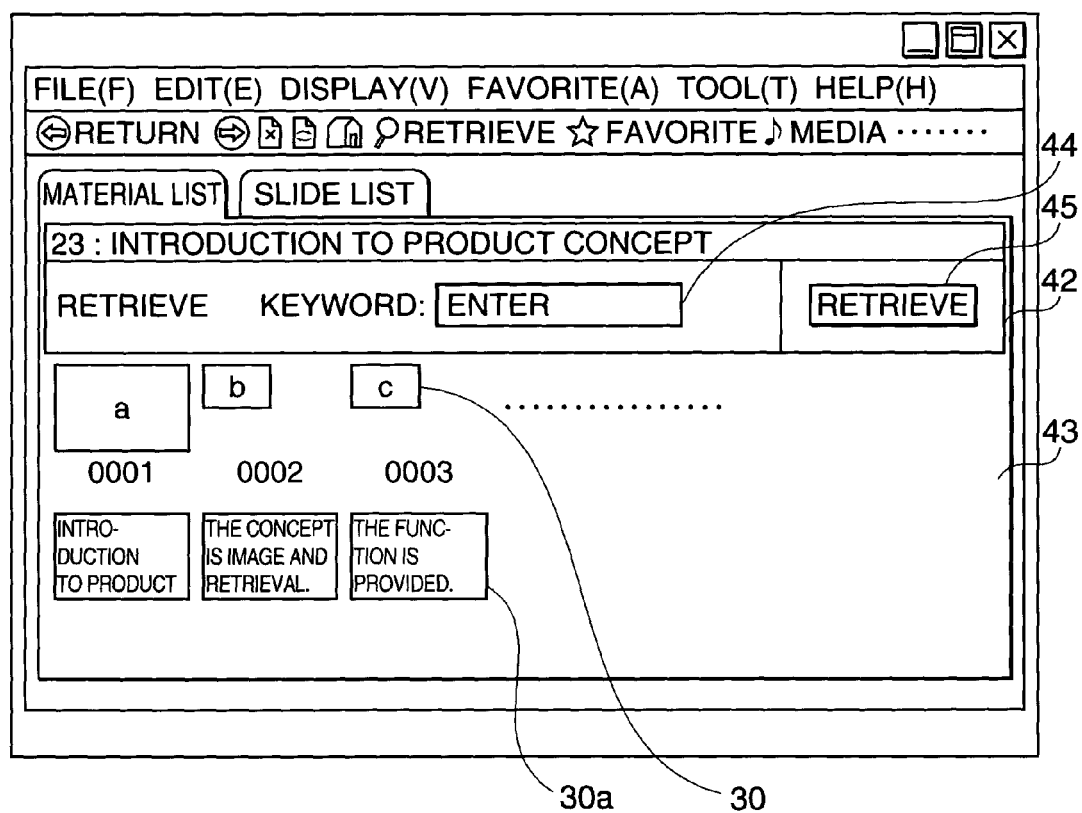
FIG. 9 is a diagram showing another embodiment of a screen display of the browsing client according to an embodiment of the present invention.

A list of material images to be displayed may be changed in display size (see FIG. 13, element 150) as shown in FIGS. 8 and 9. The size change may be made by a change function of the browsing clients 2 upon a detail display request, for example, by appending information based on a reference value to the material images. The size change may be made by a change function of the delivery server 1 instead of the browsing clients 2. Furthermore, instead of making the size change upon a detail display request, the size change may be made according to size change data prepared in advance.

Various criteria may be set as required. For example, in the case where a criterion is adopted that increases size according to the length of scenes in associated video data, as shown in FIG. 8, a material image (b) longer in scene length than other material images (a and c) may be displayed in a larger size than the other material images to visually show that it is important information having been used for a long time in a videoed lecture.

Figure 10A:
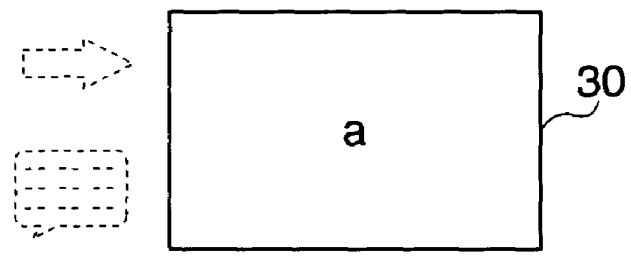
FIGS. 10A, 10B, and 10C are diagrams for explaining of a display embodiment of a material image according to an embodiment of the present invention.
Figure 10B:
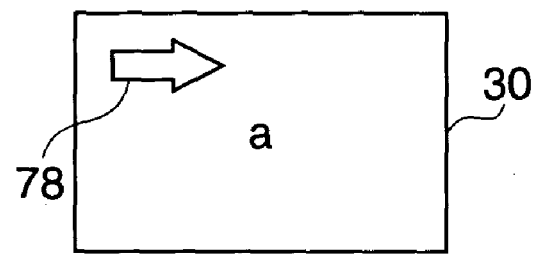
Figure 10C:
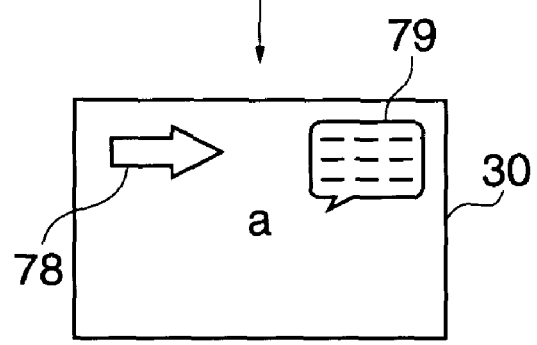

As shown in FIGS. 10A-C, some material images 30 are added with images of arrow 78 and comment 79 additionally prepared. As shown in FIGS. 10A to 10C in order, images of arrow 78 and comment 79 are sequentially added to a material image 30 and displayed in the course of the reproduction of video data.

As shown in FIG. 9, a material image (a) having such additional images 78 and 79 (as shown in FIGS. 10A-C) may be displayed in a larger size than material images (b and c) having no additional images to visually show that it is important information having been specially referenced in a videoed lecture.

As shown in FIGS. 6 to 9, for displayed slide images and material images 30, when the user selects any of them by a pointing operation, the video player 35 (as shown in FIG. 5) is displayed on the screen, and video data 5 (as shown in FIGS. 2A and 2B) is reproduced for screen display from time positions with which data 6 and 7 (as shown in FIGS. 2A and 2B) of the selected slide image and material image are associated. The browsing clients 2 (as shown in FIG. 1) have this function. By this function, from slide images and material images, video data can be located and reproduced.

Next, a description will be made of processing for registering the video data 5, image data, and the like in the delivery server 1 in association with each other.

Figure 11A:
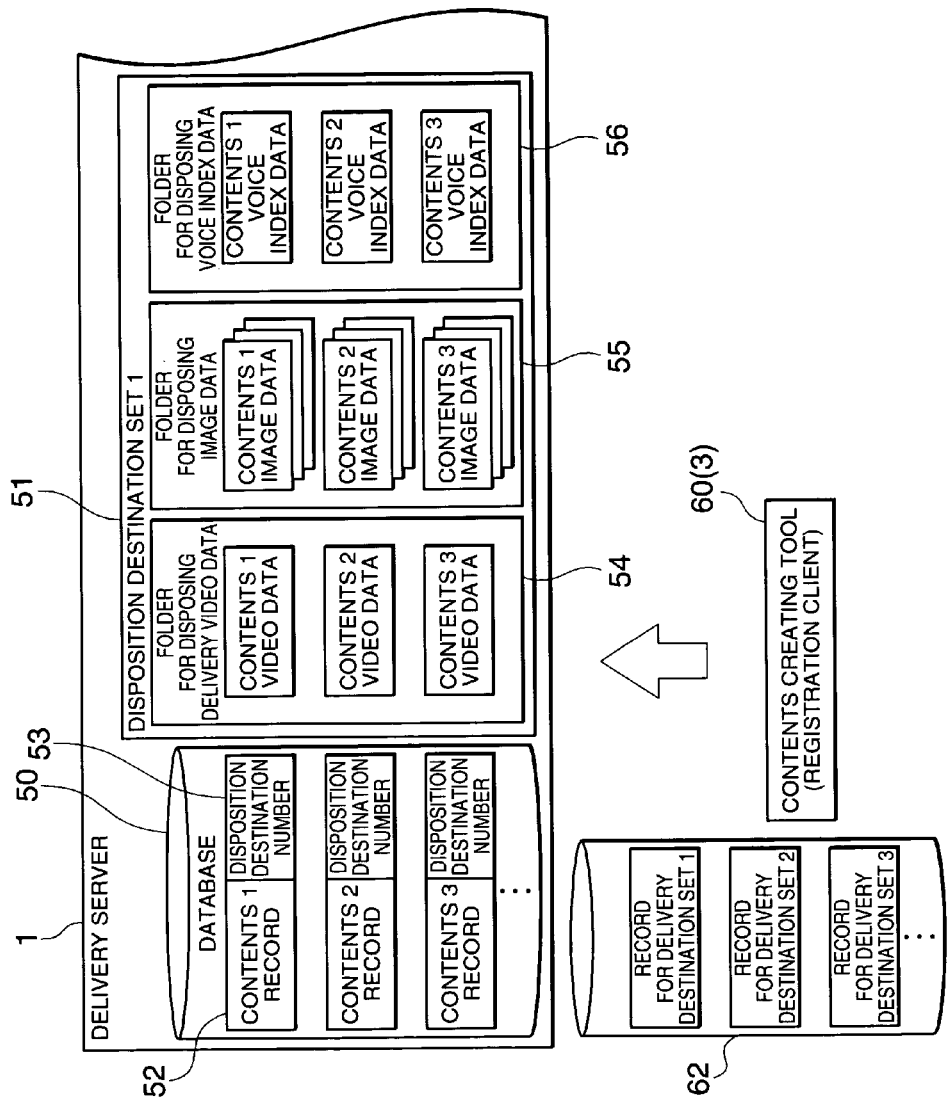
FIG. 11 is a diagram for explaining a delivery server according to an embodiment of the present invention.

As shown in FIGS. 11A-B, a disposition server 1 is provided with a database 50 storing and managing records of disposed and registered contents, and disposition destination sets 51 storing the entities of contents data.

The database 50 stores and manages contents records 52 containing meta-data of contents data, disposition destination file path, disposition destination URL, and the like, as well as numbers 53 for locating disposition destination sets in which the contents data is disposed and registered. By consulting the database 50, contents data can be disposed and registered in a folder within the disposition sets 51, and specified contents data requested from the browsing clients 2 can be delivered.

Each of the disposition destination sets 51 is a storage area storing one or plural pieces of contents data, and a contents data storage area of the disposition server 1 is formed as a collection of the disposition destination sets 51.

In the shown example, each disposition destination set 51 is provided with a video data folder 54 storing video data, an image data folder 55 for storing static image data associated with reproduction time positions of video data, and a voice index folder 56 for storing voice index data. Corresponding data of each contents is registered and stored in the folders 54 to 56 so that data of same contents is stored in one disposition destination set 51.

Contents data is disposed and registered in the disposition destination sets 51 by a contents creation tool 60(3) possessed by the registration client 3 according to operator operations.

The contents creation tool 60 performs: converting video data of MPEG or other formats into video data of stream format for delivery; registering converted video data; registering the video data 5 in association with the image data 6; registering the video data 5 in association with the material image data 7 as described later; and registering the video data 5 in association with voice index data.

Disposition and registration of contents data (video data, image data, voice index data) is started by inputting the contents data to be registered to the registration client 3 to perform association processing and other necessary processing, and connecting the registration client 3 to the delivery server 1.

The registration client 3 consults set records 62 from the database 50, sets a disposition destination set number of the contents data of an archive file, file paths of individual media data, and URLs of individual media data, and transmits the contents data to the delivery server 1 to register it.

At this time, meta-data input by the operator as described above is also set in a contents record 52, and the contents record 52 and a set record 62 are associated by a disposition destination set number.

Contents data thus registered and disposed is provided from the delivery server 1 by consulting the database 50 according to a request from the browsing clients 2.

Next, a description will be made of processing for associating the video data 5 and the material image data 7 by the registration client 3.

Figure 12:
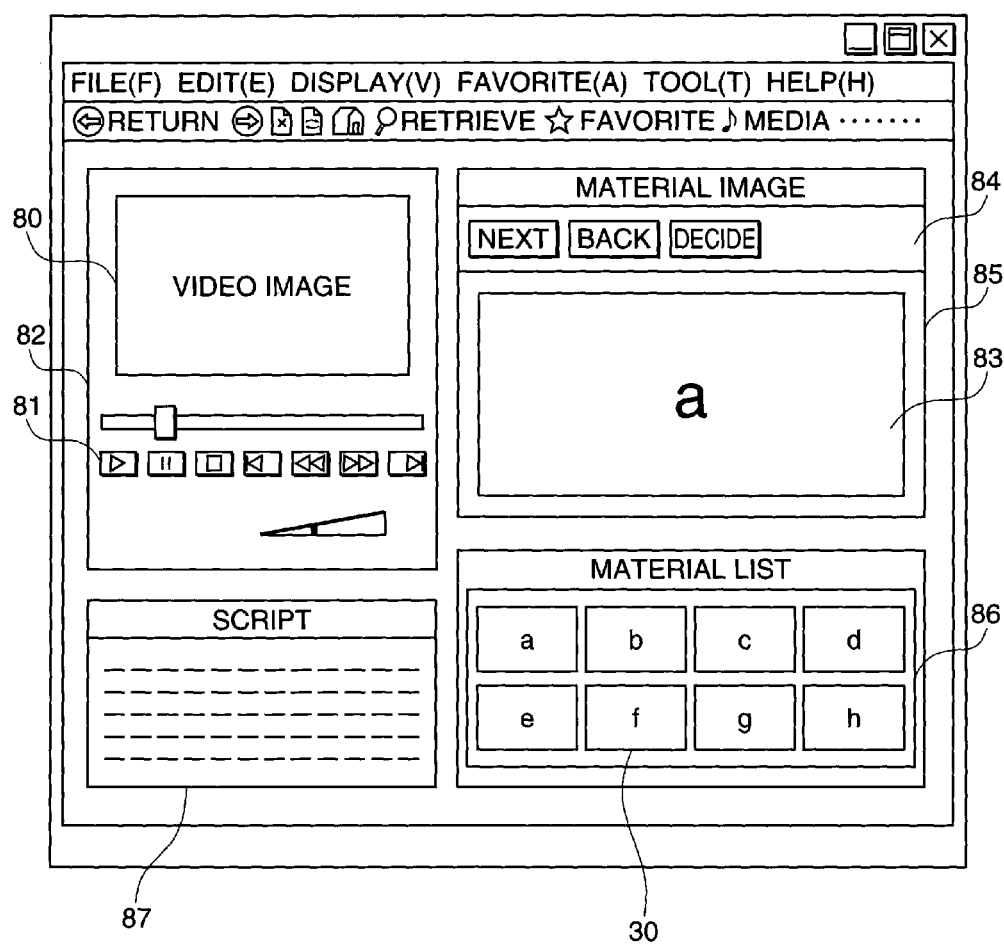
FIG. 12 is a diagram showing a screen display of a registration client according to an embodiment of the present invention.

FIG. 12 shows an association processing interface displayed on the screen of the registration client 3. The interface is used by the operator to associate the material image data 7 with given time positions of the video data 5 as preprocessing of the registration processing.

After a video data file and a material image data file are read into the registration client 3, the association processing is performed according to the operator's operations through the association processing interface displayed on the screen.

The interface screen includes: a video player part 82 having a video screen 80 for displaying video images produced by reproducing the video data 5, and a video operation part 81 provided with reproduction, stop, and other operation buttons; an image display part 85 for reproducing and displaying static image data, the image display part 85 having an image screen 83 for displaying material images produced by reproducing the material image data 7, and an operation part 84 provided with a frame advance button and a decision button; a list display part 86 for providing a thumb nail screen of plural material images 30 contained in the read material image data file; and a script display screen part 87 for displaying association relation information obtained by association operations. These display parts are on an identical screen.

By operating the interface screen by pointing input, the operator can enlarge any of the material images 30 displayed in the list display part 86 by the frame advance button of the operation part 84 on the image screen 83 to obtain its details. Also, the operator can reproduce video data by an operation button of the video operation part 81 and display a video image on the video screen 80. By pressing the decision button of the operation part 84 by pointing input during reproduction of the video data, the operator can associate material image data displayed on the image screen 83 with a relevant reproduction time position of the video data.

Therefore, based on the association relation information, as described above, from material images, the scenes of corresponding video images can be located and reproduced.

Although a description has been made of a system in which the browsing clients 2 reproduce data delivered from the delivery server 1, an image retrieval system of the present invention may be of a standalone system configuration in which video data and material image data associated therewith are held; where such a configuration is employed, by retrieving relevant material image data within the system, the display, and selection and reproduction of video data can be performed in the same embodiments as described above.

As described above, according to the present invention, since keyword retrieval is performed using character strings contained in static image data associated with video data, images of desired information can be easily located. Also, scenes in video data corresponding to a retrieved image can be easily located.

The entire disclosure of Japanese Patent Application No. 2002-272567 filed on Sep. 19, 2002 including specification, claims, drawings and abstract is incorporated herein by reference in its entirety.

What is claimed is:

1. An image retrieval apparatus, comprising:
a storage unit that stores static image data associated with time positions in a video data, the static image data being displayed with the video during time positions with which the static image data are associated;
an input unit that accepts an input keyword from a user;
an extraction unit that extracts a character string contained in the static image data by at least one of (1) extracting text data from the static image data which has the text data, and (2) performing character recognition processing on the static image data and extracting text data which is a result of the processing;
a retrieval unit that matches the extracted character string with the input keyword to retrieve relevant static image data, the retrieval unit retrieving meta-data and voice index data that include the input keyword;
a retrieval result display unit that displays the retrieved relevant static image data, varying size of the displayed relevant static image data based on (1) a time length of a corresponding video scene in which the static image data is associated, and (2) an amount of change in scene contents of a corresponding video scene in which the static image data is associated; and
a video display unit that, according to the user's operation for selecting at least one of the displayed relevant static image data, reproduces and displays associated video data during time positions with which the selected static image data are associated.

2. An image retrieval method comprising:

performing an extraction, with an extraction unit, that extracts a character string contained in the static image data by at least one of (1) extracting text data from the static image data which has the text data, and (2) performing character recognition processing on the static image data and extracting text data which is a result of the processing;

matching an input keyword input by the user with the extracted character string, with a retrieval unit, to retrieve relevant static image data and retrieving meta-data and voice index data that include the input keyword;

displaying the retrieved relevant static image data, varying the size of the displayed relevant static image data based on (1) a time length of a corresponding video scene in which the static image data is associated, and (2) an amount of change in scene contents of a corresponding video scene in which the static image data is associated; and reproducing and displaying on a video display unit, according to the user's operation for selecting at least one of the displayed relevant static image data, associated video data during time positions with which the selected static image data are associated.

3. A storage non-transitory medium readable by a computer, the non-transitory storage medium storing a program of instructions executable by the computer to perform a function for retrieving image data, the function comprising:

accepting an input keyword from a user;

performing an extraction that extracts a character string contained in the static image data by at least one of (1) extracting text data from the static image data which has the text data, and (2) performing character recognition processing on the static image data and extracting text data which is a result of the processing;

matching the extracted character string with the input keyword to retrieve relevant static image data and retrieving meta-data and voice index data that include the input keyword;

displaying the retrieved relevant static image data, varying the size of the displayed relevant static image data based on (1) a time length of a corresponding video scene in which the static image data is associated, and (2) an amount of change in scene contents of a corresponding video scene in which the static image data is associated; and reproducing and displaying, according to the user's operation for selecting at least one of the displayed relevant static image data, associated video data during time positions with which the selected static image data are associated.

4. The image retrieval apparatus of claim 1, wherein the video display unit displays a time scale including a slidable plug, and the user's operation for selecting at least one of the displayed relevant static image data comprises moving the slidable plug to select a slide image that is associated with the time position of the video data to be replayed.

5. The method according to claim 2, wherein the user's operation for selecting at least one of the displayed relevant static image data comprises moving a slidable plug on a displayed time scale to select a slide image that is associated with the time position of the video data to be replayed.

6. The non-transitory storage medium according to claim 3, wherein the user's operation for selecting at least one of the displayed relevant static image data comprises moving a slidable plug on a displayed time scale to select a slide image that is associated with the time position of the video data to be replayed.

7. The image retrieval apparatus according to claim 1, wherein the input keyword is converted into voice waveform data, the voice waveform data being matched by the retrieval unit during the retrieval of the voice index data.

8. The method according to claim 2, further comprising:
converting the input keyword input by the user into voice waveform data and matching the voice waveform data with the voice index data.

9. The function for retrieving image data according to claim 3, further comprising:
converting the input keyword input by the user into voice waveform data and matching the voice waveform data with the voice index data.

* * * * *